United States Patent [19]
Decker

[11] Patent Number: 6,096,387
[45] Date of Patent: Aug. 1, 2000

[54] METHODS FOR PROVIDING SELF-ADHESIVE RESEALABLE TAMPER-EVIDENT TAPE

[75] Inventor: Thomas A. Decker, Convent Station, N.J.

[73] Assignee: Decker Tape Products, Co., Inc., Fairfield, N.J.

[21] Appl. No.: 09/358,076

[22] Filed: Jul. 21, 1999

Related U.S. Application Data

[62] Division of application No. 09/074,828, May 8, 1998, Pat. No. 6,033,762.

[51] Int. Cl.[7] .................................................. C08J 7/04
[52] U.S. Cl. .................... 427/510; 427/208; 427/208.4; 427/208.6; 427/208.8; 427/265; 427/407.1
[58] Field of Search .................... 427/208, 208.4, 427/208.6, 208.8, 265, 407.1, 510

[56] References Cited

U.S. PATENT DOCUMENTS

| | | | |
|---|---|---|---|
| 4,454,956 | 6/1984 | Patterson | 220/214 |
| 4,557,505 | 12/1985 | Schaefer et al. | 283/81 |
| 4,787,158 | 11/1988 | Vitol | 40/638 |
| 4,876,123 | 10/1989 | Rivera et al. | 428/34.2 |
| 4,980,222 | 12/1990 | Rivera et al. | 428/195 |
| 5,082,702 | 1/1992 | Alband | 428/36.92 |
| 5,346,259 | 9/1994 | Mocilnikar et al. | |
| 5,516,581 | 5/1996 | Kreckel et al. | 428/317.3 |
| 5,551,729 | 9/1996 | Morgan | |
| 5,582,887 | 12/1996 | Etheredge | 428/41.5 |
| 5,631,068 | 5/1997 | Smith | 428/195 |

FOREIGN PATENT DOCUMENTS 0 763 809  11/1996  European Pat. Off. .

*Primary Examiner*—Bernard Pianalto
*Attorney, Agent, or Firm*—Fish & Neave

[57] ABSTRACT

A self-wound, self-adhesive, resealable tamper-evident tape is provided. The tape is used to seal any container requiring a self-adhesive closure, such as bags or pouches, and provides clear visual evidence if the self-adhesive seal is peeled apart. The tape comprises a backing sheet, the upper surface of which is coated with a release layer, and the bottom surface with an adhesive. The release layer is relatively non-adherent to the adhesive so that the tape may be wound or rolled up without a separating liner. A non-visible patterned varnish layer is applied to the adhesive to create a hard surface onto which an colored ink layer is subsequently applied. The colored ink layer breaks or chips when the self-adhesive seal is peeled apart and retains this appearance if the tape is reapplied to seal the container, thereby providing visible evidence of tampering.

7 Claims, 3 Drawing Sheets

METHODS FOR PROVIDING SELF-ADHESIVE RESEALABLE TAMPER-EVIDENT TAPE

CROSS REFERENCE TO RELATED APPLICATION

This is a division of commonly-assigned U.S. patent application Ser. No. 09/074,828, filed May 8, 1998, U.S. Pat. No. 6,033,762.

BACKGROUND OF THE INVENTION

This invention relates to tape, and more particularly, to tamper-evident, self-adhesive resealable tape for packages or containers such as bags, pouches and the like. The tape of the present invention contains a printed pattern. When the tape is peeled apart, the printed pattern is broken and readily indicates that the container has been opened. This provides a warning that the contents of the container may have been tampered with or removed even if the tape is subsequently resealed to secure the container.

Package security is a major concern of purveyors, shippers, and consumers of all types of products. Packages are frequently opened and their contents removed while in transit, in storage, or even on the store shelf. Packages whose security has been violated are often resealed to avoid suspicion and remove any outward evidence of tampering or pilferage. In consequence, it is difficult to determine where in the chain of distribution the theft or tampering occurred. Tamper-evident tapes enable manufacturers, shippers, and retailers to determine where the breach occurred and take appropriate measures to root out the person or persons responsible. Tamper-evident tape is also valued by consumers of food stuffs or other products wrapped in bags or pouches for it provides assurance that the product was not opened or adulterated prior to purchase.

Containers such as bags and pouches have been made with tamper-evident closures for many years. For example, the banking industry has long used bags or pouches containing a pressure-sensitive adhesive located on one side of the opening of the bag for shipping currency or other valuable items. To close the bag, a peel-back strip covering the free side of the adhesive is removed, and the exposed surface of the adhesive is then pressed against the opposite side of the bag. If a bag of this type is opened, the pressure-sensitive adhesive will distort and break apart, and thereby indicate that the bag has been opened. Bags of this type are large, bulky, and expensive to manufacture. They are therefore inappropriate for shipping consumer products such as food, electronic parts, or pharmaceutical items, and are unsuitable for consumer use in the home.

Another common tamper-evident closure used with cardboard or paper packages, such as boxes and envelopes, is in the form of a tape or label that is applied directly to the package. This type of tape or label has one appearance when applied to the package, and takes on a second, different and distinct appearance when it is removed. If the tape is reapplied to the package, it retains the second appearance. Tapes of this type are generally used to seal the flaps of boxes or cartons by applying the tape directly to the flaps to hold them in place and thereby secure the contents from tampering or removal.

Typically, this kind of tape displays a trademark or logo, or other information such as "This Side Up" or "Fragile," when first applied to the container. When the tape is removed from the container to gain access to its contents, the tape leaves behind some indication, such as the words "Void" or "Opened," to indicate that the container has been opened. This message remains on the container even when the tape is reapplied and prevents the tape from obscuring the revealed indication. Tapes of this kind are commonly used on containers such as boxes or cartons and must be applied directly to the container (e.g., over a flap or opening) in order to be most effective. Tapes of this sort would be undesirable for containers that need to be resealed such as bags or pouches because such containers preferably require a self-adhesive closure that can be reapplied (i.e., resealed) if necessary.

Furthermore, currently available tamper-evident tape is provided in long lengths in the form of a roll so that it may be applied automatically by machine. Such tapes necessarily include, however, a sheet of lining material that is interposed between and separates the adhesive coating from the underlying exposed surface of the tape to prevent the two from sticking together when the tape is provided in the form of a roll. The liner must be removed from the tape and discarded before the tape is applied to the container. A liner thus creates more work for the user and decreases efficiency. It is also more difficult and expensive to use automatic equipment to apply tape containing a liner.

It is therefore an object of the present invention to provide a self-wound, self-adhesive, resealable tamper-evident tape for containers such as bags or pouches.

SUMMARY OF THE INVENTION

The tape of the present invention can be used to seal any container requiring a self-adhesive closure, but is preferably used for sealing bags or pouches used for storing and shipping such things as food products, pharmaceutical items, electronic components, or any product for which package security and a means for detecting tampering is desired. After the tape has been used to seal the bag, the tape provides clear visual evidence of tampering if the self-adhesive seal is peeled apart. This visual evidence remains even when the tape is reapplied to the bag.

The tape comprises a preferably transparent backing sheet which provides the structural integrity needed for a flexible yet durable sealing tape. The upper surface of the backing sheet is coated with a release layer that is relatively non-adherent to an adhesive layer coating the bottom of the backing sheet. Because the upper release layer is relatively non-adherent to the adhesive layer, the tape may be wound or rolled up without a separating liner.

The adhesive layer is applied over the entire lower surface of the backing layer whereby the adhesive layer is effective to secure the tape to the bag as well as to itself to provide a self-adhering resealable bond.

A non-visible patterned layer of varnish, preferably a UV-curable varnish, is applied to the adhesive layer. The UV-curable varnish creates a hard surface on the adhesive layer and is not absorbed into the adhesive layer over time as would a solvent-based adhesive deadener. The non-visible varnish pattern is preferably a uniform and symmetrical pattern, for example a linked chain of X's, which will provide a clear indication of tampering when the pattern is altered or broken in any way. The non-visible varnish pattern partially covers the adhesive layer and thus provides uncovered areas of adhesive such that the tape is able to bond both to the bag to which it is applied, and to the tape itself, to form a self-adhesive seal.

Finally, a colored layer, preferably a colored ink layer, is applied only over the patterned varnish layer to allow the pattern on the tape to be clearly visible and easily identified.

The colored ink layer provides visible evidence of tampering by appearing "broken" or "chipped" when the self-adhesive seal of the tape is peeled apart.

When the tape is initially applied to a container, such as a bag or pouch, the tape wraps around a twisted portion of the bag, with the ends of the tape length preferably extending far enough so that they may be sealed to each other. When the self-adhesive seal is formed, areas of ink on one end of the tape adhere to areas of adhesive on the opposite end of the tape. The adhesive to ink bond that forms when the tape is applied to itself is relatively stronger than the ink to varnish bond that exists before the tape is applied. As a result, when the self-adhesive seal is peeled apart, areas of ink will separate from the varnish layer and tear resulting in the ink pattern appearing distorted and broken to indicate that the bag or pouch was tampered with.

Further features of the invention, its nature and various advantages will be more apparent from the accompanying drawings and the following detailed descriptions of the preferred embodiments.

DETAILED DESCRIPTION OF THE PREFERRED EMBODIMENTS

Figure 1:
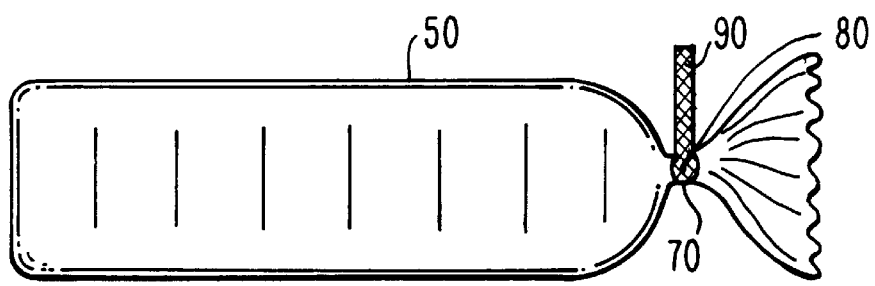
FIG. 1 is a diagram of a bag to which the tamper-evident resealing tape in accordance with the present invention has been applied.
Figure 2:
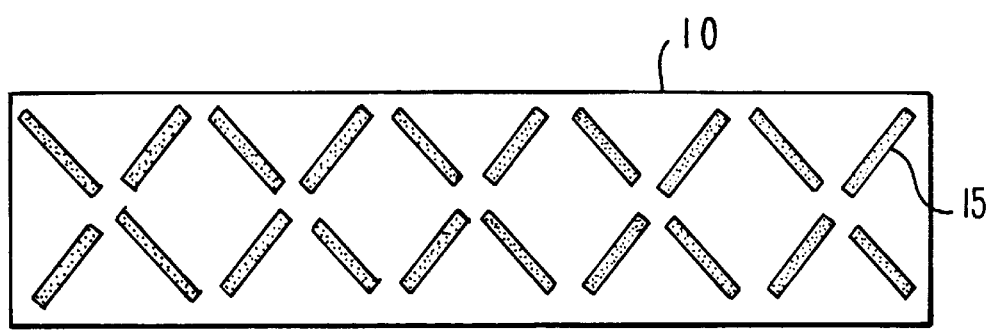
FIG. 2 is a top view of the tamper-evident resealable tape in accordance with the present invention.

A self-adhesive resealable tamper-evident tape 10 in accordance with the present invention is shown in FIG. 2. The tape typically is supplied in long lengths in the form of a roll to facilitate use and handling. When needed, the tape is usually unrolled to a desired length, separated from the roll, and secured to a container, preferably a bag or pouch 50 as shown in FIG. 1.

The bag or pouch 50 shown in FIG. 1 is typically made of a plastic material used for storing or shipping such items as food products, pharmaceuticals, electronic components, etc. For example, bakeries typically ship bread or rolls to supermarkets in plastic bags as shown in FIG. 1.

Bag 50 is preferably sealed by pinching or twisting the open end of the bag to a point 70. As is conventional, a piece of tape 10 is then applied around the twisted portion 70 of bag 50 such that an area of tape 80 is applied and adheres to the twisted portion of the bag while the remainder of the tape 90 is applied and adheres to itself to form a self-adhesive bond and a secure seal. The tape may be applied mechanically using automatic bag sealing equipment which is commonly available in the industry. To open the bag and gain access to its contents without damaging the bag, the tape must be peeled apart and removed. The tape may then be used to close and reseal the bag as many times as necessary.

Figure 3:
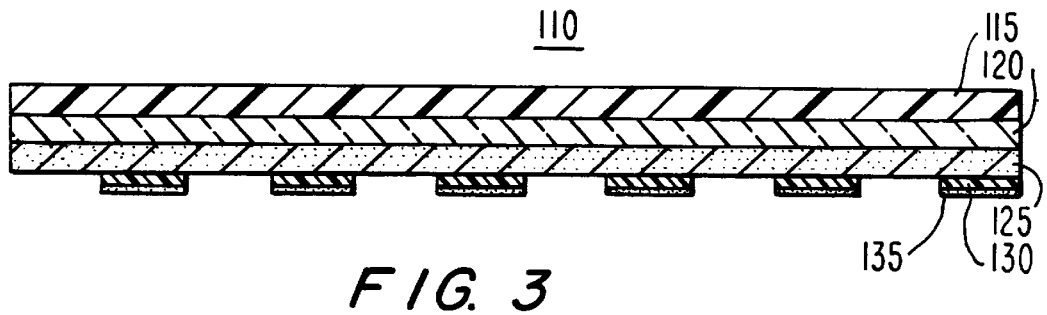
FIG. 3 is a cross-sectional view of the tamper-evident resealable tape in accordance with the present invention.

A cross-sectional view 110 of the tape is shown in FIG. 3. The tape comprises a preferably transparent backing sheet 120 which provides the structural integrity needed for a flexible yet durable sealing tape. The upper surface of the backing sheet 120 is preferably coated with a release layer 115 which adheres to the backing sheet but which is relatively non-adherent to the adhesive layer 125 coating the bottom surface of the backing sheet 120. Because the release layer 115 is relatively non-adherent to the adhesive layer 125, when a length of the tape is rolled up, each turn of the tape has the release layer 115 in contact with the adhesive layer 125 of the adjacent turn of the tape. Consequently, the turns of the rolled tape will not stick together, and the tape can be easily unrolled without the need of a separating liner.

Avoiding the use of a separating liner has several advantages. A separating liner, typically, adds weight and bulk to the roll of tape, and thus limits the size of rolls for easy handling. In addition, the liner must be removed from the tape before it is applied and then discarded. A liner thus entails extra work, and reduces the efficiency of an operator who may be applying tape to many containers as is typical in a manufacturing environment. Furthermore, the use of a liner which must be removed and discarded makes it difficult if not impossible to apply the tape to containers by means of mechanical or automatic equipment such as automatic bag sealing machinery.

The adhesive layer 125 is applied over the entire lower surface of the backing layer 120. The adhesive layer is effective in both securing the tape to the bag (FIG. 1, 80) as well as securing the tape to itself (FIG. 1, 90) to form the self-adhering resealable bond.

A patterned varnish layer 130, preferably a UV-curable varnish, is applied to the adhesive layer 125. The use of ultraviolet (UV) light facilitates the curing process as well as improves overall manufacturing efficiency. While using UV light is preferred, other curing techniques can also be used. The UV-curable varnish layer creates a hard surface on the adhesive layer and is not absorbed into the adhesive layer over time as would a solvent-based adhesive deadener. The pattern of the applied varnish, is preferably a uniform of symmetrical pattern, for example, a successive chain of X's as is shown in FIG. 2 by pattern 15. The uniform pattern 15 will provide clear indication of tampering if the pattern is altered or broken in any way. The varnish layer 130 partially covers adhesive layer 125 thus providing uncovered areas of adhesive used for bonding.

Finally, a colored layer 135, preferably a colored ink layer, is applied to the patterned varnish layer 130 to allow the pattern on the tape to be clearly visible and easily identified. As described below, the colored ink layer 135 provides visible evidence of removal or tampering by appearing "broken" or "chipped" when the tape is peeled apart after being initially applied to the bag or container.

In a typical application, the tape is wrapped around the twisted or pinched portion 70 of the bag (FIG. 1). The tape is also preferably long enough so that both ends of the tape extend beyond the twisted portion 70 and may be applied to one another to form a self-adhesive bond.

Figure 4:
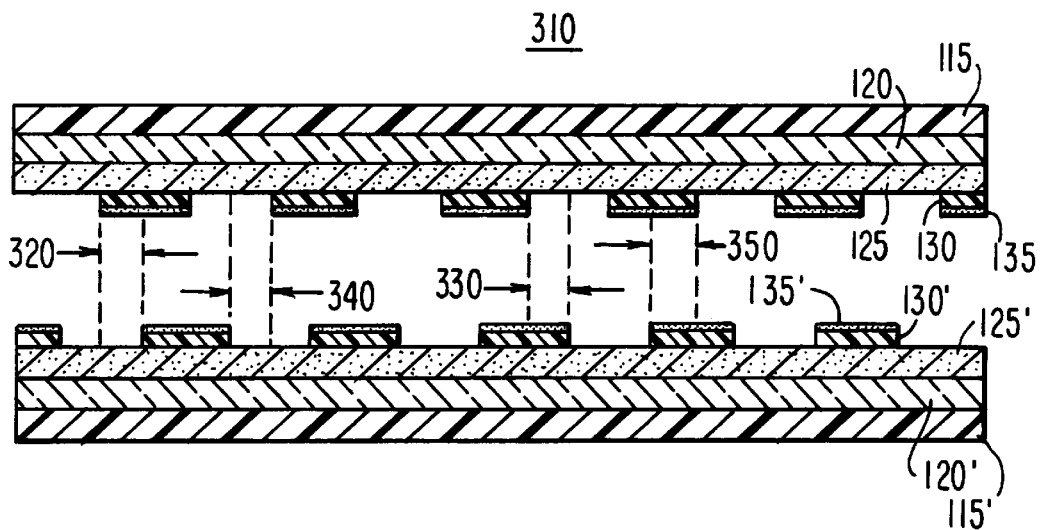
FIG. 4 is a view similar to FIG. 3 but showing the alignment and relationship of the parts when the tape is applied to itself in accordance with the present invention.

A cross-sectional view 310 of the tape showing the alignment and relationship of the parts of the tape when the tape is applied to itself is shown in FIG. 4. Each end of tape is structurally identical to the other (i.e., comprising the same layer composition as described in FIG. 3), except FIG. 4 shows each end facing each other just prior to the self-adhesive bond forming. As shown in FIG. 4, areas of ink 135 and 135' adhere to opposing areas of adhesive 125' and 125 within regions 320 and 330. Similarly, areas of adhesive 125 adhere to opposing areas of adhesive 125' within region 340. Also, areas of ink 135 simply overlap with opposing areas of ink 135' within region 350.

Figure 5:
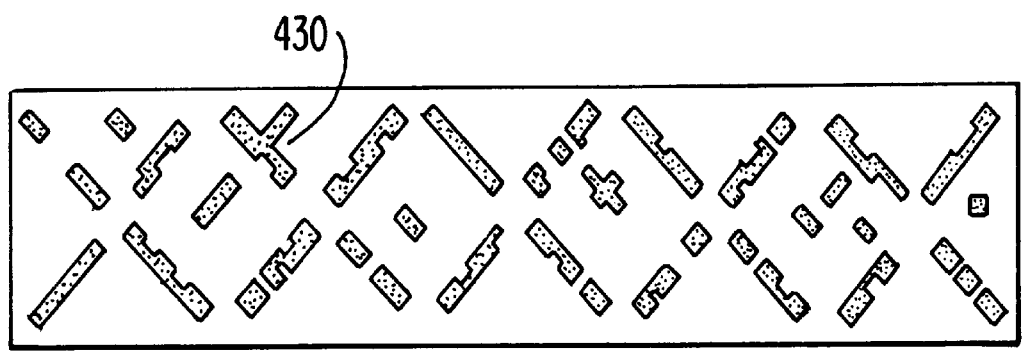
FIG. 5 is a top view of the tape after it has been separated from itself in accordance with the present invention.

Once the self-adhesive bond is formed, the composition of the tape is such that the bond between the ink layer 135 and adhesive layer 125 is stronger relative to the bond between the ink layer 135 and varnish layer 130. However, the bond between the ink layer 135 and varnish layer 130 is stronger relative to the mere overlapping of ink layers 135 and 135'. As a result, when the self-adhesive seal is peeled apart, the ink sections bonded to the adhesive will remain bonded to the adhesive and will separate from the varnish sections to which they were originally bonded. However, the ink sections 135 merely overlapping (i.e., no bond formed) the opposing ink section 135' will remain bonded to their respective varnish layers (130 and 130'). This effectively will cause the ink to break or tear and create a visually distorted pattern 430 as shown in FIG. 5 when the tape is peeled apart, and provide clear evidence of tampering. Because the ink layers 135 and 135' are actually torn when the self-adhesive seal is separated and do not re-adhere to the varnish layers, any attempt to restore the tape to its original appearance (FIG. 2) will be unsuccessful and the ink pattern will remain visibly broken and distorted.

Moreover, areas of adhesive which did not bond to areas of ink when the self-adhesive bond was originally formed (FIG. 4, 340) remain uncovered at the lower surfaces of each end of tape when the self-adhesive bond is peeled apart. As a result, the tape can be re-applied to the bag and resealed even though the ink pattern is distorted. When the self-adhesive seal is again peeled apart, additional areas of ink 135 and 135' separate from varnish layers 130 and 130' causing those ink sections to break and tear thus producing an ink pattern appearing even further distorted and broken. Although appearing further distorted, the tape can again be resealed with uncovered adhesive on the lower surface of the tape.

The backing sheet 120 may be formed of a clear plastic such as polyester, styrene, polypropylene, polyethylene, polyvinyl chloride, polyamides or other suitable plastics.

The adhesive layer 125 may be formed of any suitable, preferably solvent-based, adhesive which has the desired adhesive characteristics with respect to the type of object to which the tape is to be secured and which has the desired self-adhesive characteristics. The specific nature of the adhesive layer 125 may vary widely, and for each specific adhesive composition specific modifications of the composition and characteristics of the release layer 115 will also be called for.

The release layer 115 is preferably formed of a suitable silicone material, but solvent silicone is also often used.

The foregoing is merely illustrative of the principles of this invention and various modifications can be made by those skilled in the art without departing from the scope and spirit of the invention.

What is claimed is:

1. A method for providing tamper-evident, self-adhesive, resealable tape for sealing packages and containers, the method comprising the steps of:

providing a substrate having an upper and a lower surface;

coating the entire lower surface of said substrate with an adhesive layer;

coating said adhesive layer partially with a patterned varnish layer; and coating said patterned varnish layer with a colored layer.

2. The method of claim 1 further comprising the step of coating the entire upper surface of said substrate with a release layer.

3. The method of claim 2 wherein the step of coating the substrate with the release layer comprises the step of coating the substrate with a release layer that substantially does not adhere to said adhesive layer.

4. The method of claim 3 wherein the step of coating the varnish layer with the colored layer comprises the step of coating the varnish layer with a colored layer that breaks or chips when the self-adhering bond is peeled apart.

5. The method of claim 1 wherein the step of coating the varnish layer with the colored layer comprises the step of coating the varnish layer with a colored layer that adheres more strongly to the adhesive layer than to the varnish layer after the self-adhering bond is formed.

6. The method of claim 1 wherein the patterned varnish layer is UV-curable, said method further comprising the step of exposing the patterned varnish layer with UV-light.

7. The method of claim 1 wherein the step of providing the substrate comprises the step of providing a transparent substrate.

* * * * *